United States Patent
Schoeneich et al.

(10) Patent No.: US 9,143,365 B2
(45) Date of Patent: Sep. 22, 2015

(54) CHANNEL ESTIMATION USING AVERAGING AND INTERPOLATION

(71) Applicant: QUALCOMM Incorporated, San Diego, CA (US)

(72) Inventors: Hendrik Schoeneich, Heroldsberg (DE); Stefan Brueck, Neunkirchen am Brand (DE); Juan Montojo, Nuremberg (DE)

(73) Assignee: QUALCOMM Incorporated, San Diego, CA (US)

( * ) Notice: Subject to any disclaimer, the term of this patent is extended or adjusted under 35 U.S.C. 154(b) by 4 days.

(21) Appl. No.: 13/970,992

(22) Filed: Aug. 20, 2013

(65) Prior Publication Data

US 2014/0211833 A1 Jul. 31, 2014

Related U.S. Application Data

(60) Provisional application No. 61/758,659, filed on Jan. 30, 2013.

(51) Int. Cl.
*H04L 25/02* (2006.01)

(52) U.S. Cl.
CPC .......... *H04L 25/0224* (2013.01); *H04L 25/022* (2013.01); *H04L 25/0232* (2013.01)

(58) Field of Classification Search
USPC ........................................................ 375/219
See application file for complete search history.

(56) References Cited

U.S. PATENT DOCUMENTS

| | | | |
|---|---|---|---|
| 6,535,715 B2 | 3/2003 | Dapper et al. | |
| 6,553,040 B2 | 4/2003 | Bernath et al. | |
| 6,697,374 B1 | 2/2004 | Shraga et al. | |
| 7,221,645 B2 * | 5/2007 | Wang et al. | 370/203 |
| 7,224,666 B2 | 5/2007 | Gummadi et al. | |
| 7,313,203 B2 | 12/2007 | Tubbax et al. | |
| 7,443,783 B2 | 10/2008 | DeChamps et al. | |

(Continued)

FOREIGN PATENT DOCUMENTS

| | | |
|---|---|---|
| EP | 1793548 A1 | 6/2007 |
| EP | 2259517 A2 | 12/2010 |

(Continued)

OTHER PUBLICATIONS

Bhatt, T. et al. "Initial Synchronization for 802.16e Downlink," Signals, Systems and Computers, 2006. ACSSC '06. Fortieth Asilomar Conference on , vol., No., pp. 701,706, Oct. 29, 2006-Nov. 1, 2006.*

(Continued)

*Primary Examiner* — Daniel Washburn
*Assistant Examiner* — Berhanu Tadese
(74) *Attorney, Agent, or Firm* — Mahamedi Paradice LLP

(57) ABSTRACT

A method of performing channel estimation includes receiving a frame that includes, for each subcarrier of a subset of subcarriers in the frame, a pair of pilot symbols in the subcarrier. The subcarriers of the subset are regularly spaced apart from one another in the frequency domain. Time-averaged channel estimates for each subcarrier of the subset are generated based on the pairs of pilot symbols. Frequency-averaged channel estimates for respective subcarriers are generated based on the time-averaged channel estimates. Interpolation is performed between respective frequency-averaged channel estimates to generate interpolated channel estimates for subcarriers between the respective subcarriers.

27 Claims, 12 Drawing Sheets

(56) References Cited

U.S. PATENT DOCUMENTS

| | | | |
|---|---|---|---|
| 7,466,768 | B2 | 12/2008 | Su et al. |
| 7,626,921 | B2 | 12/2009 | Egashira et al. |
| 7,844,004 | B2 | 11/2010 | De Rore |
| 7,885,360 | B2 | 2/2011 | Tanabe et al. |
| 7,899,140 | B2 | 3/2011 | Yousef |
| 7,957,476 | B2 | 6/2011 | Sanada et al. |
| 7,961,696 | B2 | 6/2011 | Ma et al. |
| 8,081,690 | B2 | 12/2011 | Ma et al. |
| 8,102,832 | B2 * | 1/2012 | Agrawal et al. ............... 370/342 |
| 8,194,529 | B2 | 6/2012 | Stadelmeier et al. |
| 8,265,181 | B2 | 9/2012 | Luong et al. |
| 8,279,958 | B2 | 10/2012 | Okehie et al. |
| 8,290,083 | B2 | 10/2012 | Chrabieh |
| 2003/0072254 | A1 | 4/2003 | Ma et al. |
| 2005/0107059 | A1 | 5/2005 | Lehning et al. |
| 2006/0285484 | A1 * | 12/2006 | Papasakellariou et al. ... 370/208 |
| 2007/0025460 | A1 | 2/2007 | Budianu et al. |
| 2007/0183482 | A1 | 8/2007 | Fujita et al. |
| 2008/0063098 | A1 | 3/2008 | Lai et al. |
| 2008/0165891 | A1 | 7/2008 | Budianu et al. |
| 2008/0219332 | A1 * | 9/2008 | Brehler .......................... 375/219 |
| 2008/0267320 | A1 | 10/2008 | Dateki |
| 2008/0298227 | A1 * | 12/2008 | Jonsson ......................... 370/210 |
| 2008/0310534 | A1 | 12/2008 | Egashira et al. |
| 2009/0116581 | A1 | 5/2009 | Liau |
| 2009/0232230 | A1 * | 9/2009 | Hung et al. .................... 375/260 |
| 2009/0247172 | A1 | 10/2009 | Palanki et al. |
| 2009/0257520 | A1 * | 10/2009 | Lin et al. ...................... 375/260 |
| 2010/0085866 | A1 * | 4/2010 | Li et al. ......................... 370/208 |
| 2010/0136919 | A1 | 6/2010 | Sathananthan et al. |
| 2010/0195518 | A1 * | 8/2010 | McCloud et al. ............. 370/252 |
| 2010/0197241 | A1 * | 8/2010 | Aedudodla et al. ......... 455/67.13 |
| 2010/0208783 | A1 | 8/2010 | Lin et al. |
| 2010/0272194 | A1 * | 10/2010 | Zhengang et al. ............ 375/260 |
| 2010/0322225 | A1 * | 12/2010 | Kumar et al. ................. 370/344 |
| 2011/0085460 | A1 * | 4/2011 | Zhang et al. .................. 370/252 |
| 2011/0135036 | A1 | 6/2011 | Andgart et al. |
| 2011/0194656 | A1 | 8/2011 | Shaked et al. |
| 2011/0317785 | A1 | 12/2011 | Petrov et al. |
| 2012/0033751 | A1 * | 2/2012 | Sathananthan et al. ........ 375/260 |
| 2012/0134440 | A1 | 5/2012 | Yun et al. |
| 2012/0147761 | A1 * | 6/2012 | Zhang et al. .................. 370/252 |
| 2012/0207257 | A1 * | 8/2012 | Park et al. ..................... 375/348 |
| 2012/0275784 | A1 | 11/2012 | Soto et al. |
| 2013/0121392 | A1 * | 5/2013 | Thompson et al. ........... 375/227 |
| 2013/0188757 | A1 * | 7/2013 | Kalyani et al. ................. 375/340 |
| 2013/0259153 | A1 | 10/2013 | Varanese et al. |
| 2013/0259173 | A1 | 10/2013 | Varanese et al. |
| 2014/0010268 | A1 | 1/2014 | Yu et al. |
| 2014/0177741 | A1 * | 6/2014 | Liu et al. ....................... 375/260 |
| 2014/0198865 | A1 | 7/2014 | Pietsch et al. |
| 2014/0255029 | A1 | 9/2014 | Varanese et al. |

FOREIGN PATENT DOCUMENTS

| | | |
|---|---|---|
| GB | 2489035 A | 9/2012 |
| JP | 2004159084 A | 6/2004 |
| WO | WO-02097476 A2 | 12/2002 |
| WO | WO-2008112587 | 9/2008 |

OTHER PUBLICATIONS

Beek V.D, "ML Estimation of Time and Frequency Offset in OFDM Systems," IEEE Transactions on Signal Processing, 1997, 45 (7), p. 1800-1805.

Boyd, Ed, "EPoC Upstream Mapping", IEEE 802.3bn EPoC proceedings, San Antonio, TX, Nov. 2012, 27 pages.

Boyd, Ed, "EPoC Upstream Mapping, Part 2", IEEE 802.3bn EPoC proceedings, Feb. 2013, 16 pages.

Garavaglia A., et al., "OFDMA PHY for EPoC: a Baseline Proposal; garavaglia_01_0912", IEEE Draft; Garavaglia_01_0912, IEEE-SA, Piscataway, NJ USA, vol. 802.3bn, Sep. 22, 2012, pp. 1-30, XP068020489, [retrieved on Sep. 22, 2012], pp. 8-29.

Inamori M., et al., "IQ Imbalance Estimation Scheme in the Presence of DC Offset and Frequency Offset in the Frequency Domain", IEICE Transactions on Fundamentals of Electronics, Communications and Computer Sciences, Engineering Sciences Society, Tokyo, JP, vol. E92A, No. 11, Nov. 1, 2009, pp. 2688-2696, XP001550868,ISSN: 0916-8508, DOI: 10.1587/TRANSFUN.E92. A.2688.

Kliger A., et al., "Baseline Proposal for EPoC PHY Layer; kliger_01_0912", IEEE Draft; Kliger_01_0912, IEEE-SA, Piscataway, NJ USA, vol. 802.3bn, Sep. 22, 2012, pp. 1-26, XP068020499, [retrieved on Sep. 22, 2012], pp. 5-9, pp. 23, 24.

Kliger A., et al., "Baseline Proposal for EPoC PHY Layer; kliger_01a_0912", IEEE Draft; Kliger_01A_0912, IEEE-SA, Piscataway, NJ USA, vol. 802.3bn, Sep. 22, 2012, pp. 1-23, XP068020524, [retrieved on Sep. 22, 2012], pp. 3, 4, 10.

Kliger A., et al., "OFDM Numerology for EPoC; kliger_01_0113", IEEE Draft; Kliger_01_0113, IEEE-SA, Piscataway, NJ, USA, vol. 802.3bn, Jan. 29, 2013, pp. 1-20, XP068047297, [retrieved on Jan. 29, 2013], pp. 16-19.

Marco L., et al., "Carrier Frequency Recovery in All-Digital Modems for Burst-Mode Transmissions", IEEE Transactions on Communications, vol. 43, No. 2/3/4, Feb./Mar./Apr. 1999, p. 1169-1178.

Montreuil L., "EPoC Modulation Orders EPoC Modulation Orders; Montreuil_01_0512", IEEE Draft; Montreuil-01_0512, IEEE-SA, Piscataway, NJ, USA, vol. 802.3.epoc, Aug. 11, 2012, pp. 1-18, XP017752080, [retrieved on Aug. 11, 2012], pp. 6-17.

International Search Report and Written Opinion—PCT/US2014/010934—ISA/EPO—Mar. 6, 2014.

Fertl P.et al., "Channel estimation in wireless OFDM systems with irregular pilot distribution," ieee transactions on signal processing, vol. 58, No. 6, Jun. 2010.

Khedr M. et al.,"Channel estimation for wimax systems using fuzzy logic cognitive radio," wireless and optical communications networks, 2009. wocn '09. IFIP international conference on, vol., No., pp. 1,6, Apr. 28-30, 2009.

Shen Y. et al., "On uplink channel estimation in wimax systems" international journal of mobile computing and multimedia communications, 2(2), 67-77, Apr. Jun. 2010.

* cited by examiner

650

Receive a frame that includes, for each subcarrier of a subset of subcarriers in the frame, a pair of pilot symbols in the subcarrier. The subcarriers of the subset are regularly spaced apart from one another in the frequency domain. (602)

The pairs of pilot symbols are in adjacent OFDM symbols. (652)

The pairs of pilot symbols have a staggered spacing in the time domain. (654)

De-stagger the pairs of pilot symbols. (656)

Perform pilot matching for the pilot symbols. (658)

Generate channel estimates corresponding to the pilot symbols, based on the pilot matching. (660)

Generate time-averaged channel estimates for each subcarrier of the subset based on the pairs of pilot symbols. (604)

Take the average of channel estimates corresponding to respective pairs of the pilot symbols. (662)

Generate frequency-averaged channel estimates for respective subcarriers based on the time-averaged channel estimates. (606)

Use a sliding frequency window to specify subcarriers for which respective time-averaged channel estimates are to be averaged. (664)

Perform oversampling. (666)

Interpolate between respective frequency-averaged channel estimates to generate interpolated channel estimates for subcarriers between the respective subcarriers. (608)

Interpolate over oversampled frequencies and downsample the results. (668)

Interpolate between a time-averaged channel estimate for an edge subcarrier and a frequency-averaged channel estimate for another subcarrier. (670)

FIG. 6B

CHANNEL ESTIMATION USING AVERAGING AND INTERPOLATION

RELATED APPLICATION

This application claims priority to U.S. Provisional Patent Application No. 61/758,659, titled "Channel Estimation for OFDMA-Based Communication," filed Jan. 30, 2013, which is hereby incorporated by reference in its entirety.

TECHNICAL FIELD

The present embodiments relate generally to communication systems, and specifically to channel estimation.

BACKGROUND OF RELATED ART

Orthogonal frequency-division multiple access (OFDMA) may be used for upstream transmissions from cable modems (CMs) to a cable modem termination station (CMTS). Different cable modems coupled to the CMTS may see different channel conditions. The CMTS may perform channel estimation to compensate for these differing channel conditions.

Accordingly, there is a need for efficient channel estimation schemes.

BRIEF DESCRIPTION OF THE DRAWINGS

The present embodiments are illustrated by way of example and are not intended to be limited by the figures of the accompanying drawings.

FIGS. 6A and 6B are flowcharts showing methods of performing channel estimation in accordance with some embodiments.

Like reference numerals refer to corresponding parts throughout the drawings and specification.

DETAILED DESCRIPTION

Figure 1A:
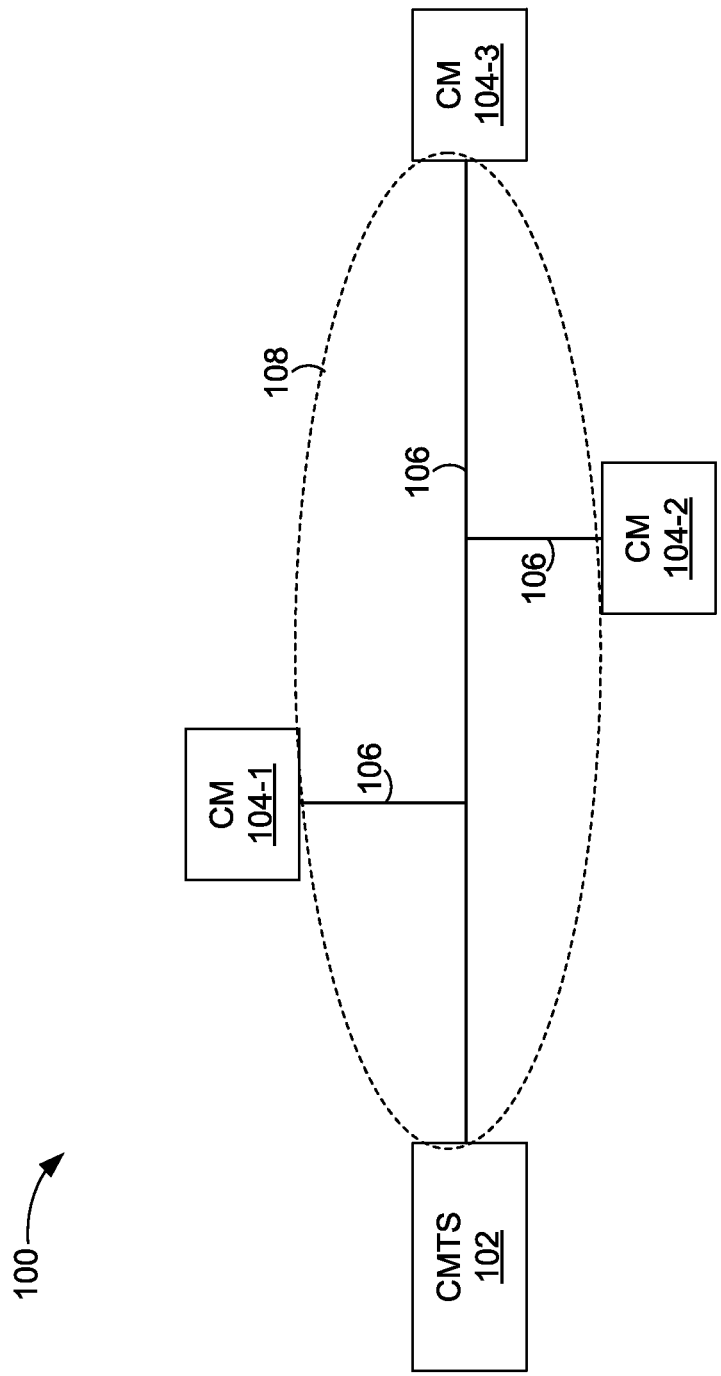
FIG. 1A is a block diagram of a coaxial network in accordance with some embodiments.

Embodiments are disclosed in which interpolation is performed between frequency-averaged channel estimates for respective subcarriers.

In some embodiments, a method of performing channel estimation includes receiving a frame that includes, for each subcarrier of a subset of subcarriers in the frame, a pair of pilot symbols in the subcarrier. The subcarriers of the subset are regularly spaced apart from one another in the frequency domain. Time-averaged channel estimates for each subcarrier of the subset are generated based on the pairs of pilot symbols. Frequency-averaged channel estimates for respective subcarriers are generated based on the time-averaged channel estimates. Interpolation is performed between respective frequency-averaged channel estimates to generate interpolated channel estimates for subcarriers between the respective subcarriers.

In some embodiments, a communications device includes a transceiver to receive a frame that includes, for each subcarrier of a subset of subcarriers in the frame, a pair of pilot symbols in the subcarrier. The subcarriers of the subset are regularly spaced apart from one another in the frequency domain. The communications device also includes one or more processors and a memory storing one or more programs configured for execution by the one or processors. The one or more programs include instructions to generate time-averaged channel estimates for each subcarrier of the subset based on the pairs of pilot symbols, instructions to generate frequency-averaged channel estimates for respective subcarriers based on the time-averaged channel estimates, and instructions to interpolate between respective frequency-averaged channel estimates in order to generate interpolated channel estimates for subcarriers between the respective subcarriers.

In some embodiments, a non-transitory computer-readable storage medium stores one or more programs configured to be executed by one or more processors in a communications device. The one or more programs include instructions to generate time-averaged channel estimates for each subcarrier of a subset of subcarriers in a frame based on respective pairs of pilot symbols in the subset. Each subcarrier of the subset includes a respective pair of pilot symbols. The subcarriers of the subset are regularly spaced apart from one another in the frequency domain. The one or more programs also include instructions to generate frequency-averaged channel estimates for respective subcarriers based on the time-averaged channel estimates and instructions to interpolate between respective frequency-averaged channel estimates in order to generate interpolated channel estimates for subcarriers between the respective subcarriers.

In the following description, numerous specific details are set forth such as examples of specific components, circuits, and processes to provide a thorough understanding of the present disclosure. Also, in the following description and for purposes of explanation, specific nomenclature is set forth to provide a thorough understanding of the present embodiments. However, it will be apparent to one skilled in the art that these specific details may not be required to practice the present embodiments. In other instances, well-known circuits and devices are shown in block diagram form to avoid obscuring the present disclosure. The term "coupled" as used herein means connected directly to or connected through one or more intervening components or circuits. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. The present embodiments are not to be construed as limited to specific examples described herein but rather to include within their scope all embodiments defined by the appended claims.

FIG. 1A is a block diagram of a coaxial ("coax") network 100 in accordance with some embodiments. The network 100 includes a cable modem termination station (CMTS) 102 coupled to a plurality of cable modems (CMs) 104-1, 104-2, and 104-3 via coax links 106. One or more of the CMs 104-1, 104-2, and 104-3 may be replaced with a set-top box or other communications device. A respective coax link 106 may be a passive coax cable, or may also include one or more amplifiers and/or equalizers. The coax links 106 compose a cable plant 108. The CMTS 102 transmits downstream signals to the CMs 104-1, 104-2, and 104-3 and receives upstream signals from the CMs 104-1, 104-2, and 104-3.

In some embodiments, the CMTS 102 includes a coax line terminal. The coax line terminal, and thus the CMTS 102, may be part of a fiber-coax unit (also referred to as an optical-coax unit) that is coupled to an optical line terminal through an optical link, in addition to being coupled to the CMs 104-1, 104-2, and 104-3. The CMs 104-1, 104-2, and 104-3 (or other communications devices) may be referred to as coax network units.

In some embodiments, the CMs 104-1, 104-2, and 104-3 are located at the premises of respective users and the CMTS 102 is located at the headend of the cable plant 108 or within the cable plant 108.

Figure 1B:
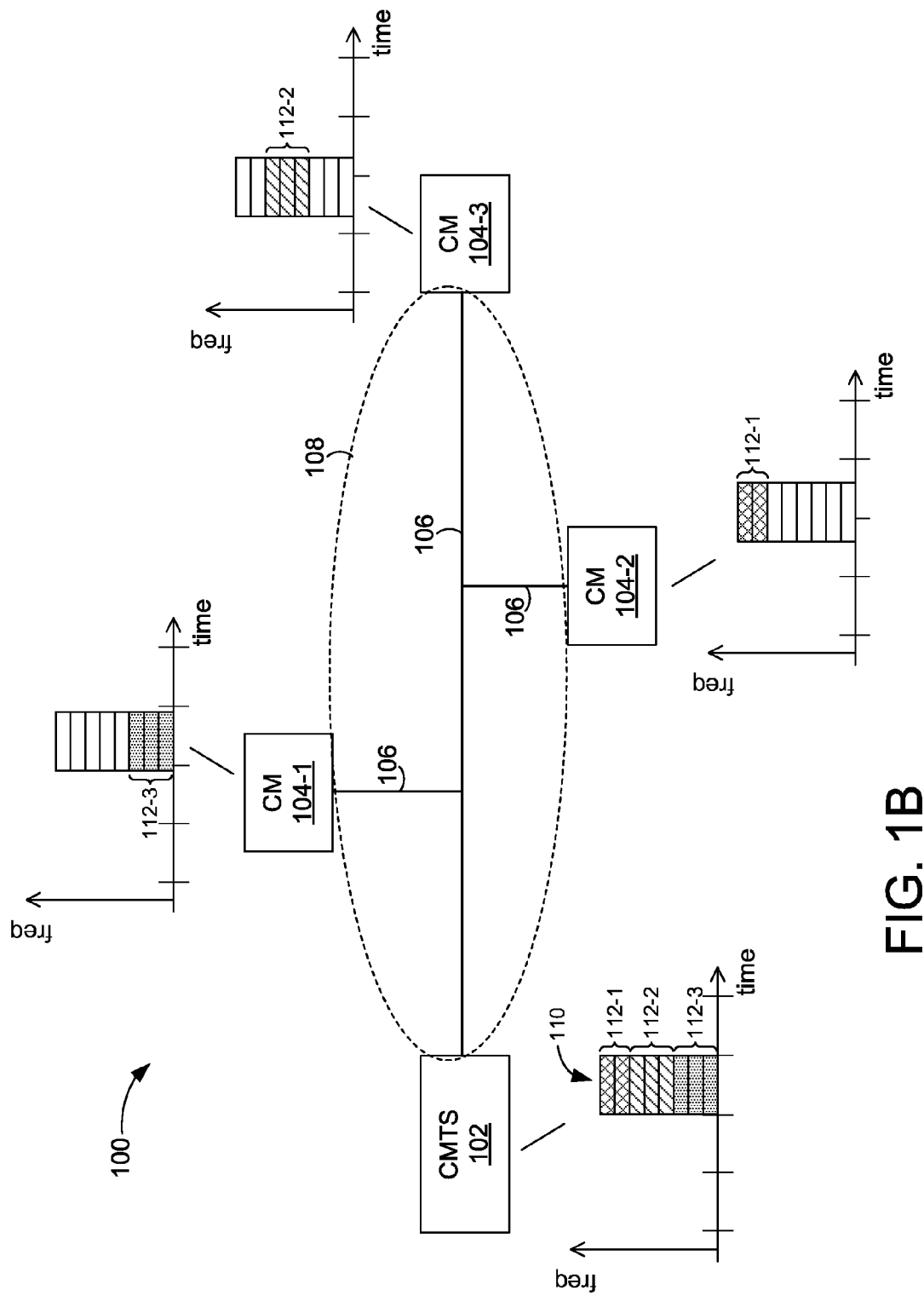
FIG. 1B illustrates upstream OFDMA transmissions in the coaxial network of FIG. 1A in accordance with some embodiments.

Upstream communications from the CMs 104-1, 104-2, and 104-3 to the CMTS 102 are performed using OFDMA, as illustrated in FIG. 1B in accordance with some embodiments. The available frequency spectrum (or spectra) for upstream communications is divided into groups of subcarriers. A first group of subcarriers 112-1 for an orthogonal frequency-division multiplexing (OFDM) symbol (or a plurality of OFDM symbols composing a frame) is allocated (and thus assigned) to CM 104-2. A second group of subcarriers 112-2 for the OFDM symbol (or frame) is allocated to CM 104-3. A third group of subcarriers 112-3 for the OFDM symbol (or frame) is allocated to CM 104-1. The groups of subcarriers 112-1, 112-2, and 112-3 are non-overlapping and, in some embodiments, contiguous. The CMs 104-1, 104-2, and 104-3 transmit upstream using their respective groups of subcarriers 112-1, 112-2, and 112-3. The precise times when each of the CMs 104-1, 104-2, and 104-3 transmits upstream are determined based on respective round-trip times (RTTs) between the CMTS 102 and the CMs 104-1, 104-2, and 104-3; the transmissions thus compensate for RTT. RTT is calculated, for example, during registration of the CMs 104-1, 104-2, and 104-3 with the CMTS 102. The transmissions as received at the CMTS 102 compose an OFDM symbol (or frame) 110 received at a specified time, and thus are substantially simultaneous from the perspective of the CMTS 102 (e.g., as a result of RTT compensation).

While FIG. 1B shows the groups of subcarriers 112-1, 112-2, and 112-3 as having fixed sizes, the number of subcarriers allocated to respective CMs 104-1, 104-2, and 104-3 may change over time (e.g., as determined by the CMTS 102). The number of consecutive OFDM symbols having a portion allocated to a specific CM 104-1, 104-2, or 104-3 also may change over time (e.g., as determined by the CMTS 102). For example, the number of OFDM symbols in a frame may change over time.

When multiple OFDM symbols are combined into a frame, known pilot symbols may be included on some of the subcarriers of each group of subcarriers 112-1, 112-2, and 112-3. The pilot symbols are included in at least some OFDM symbols in the frame. The pilot symbols allow the CMTS 102 to perform channel estimation and phase noise tracking for the transmission medium (e.g., the coax links 106) between the CMTS 102 and the CMs 104-1, 104-2, and 104-3.

Figure 2:
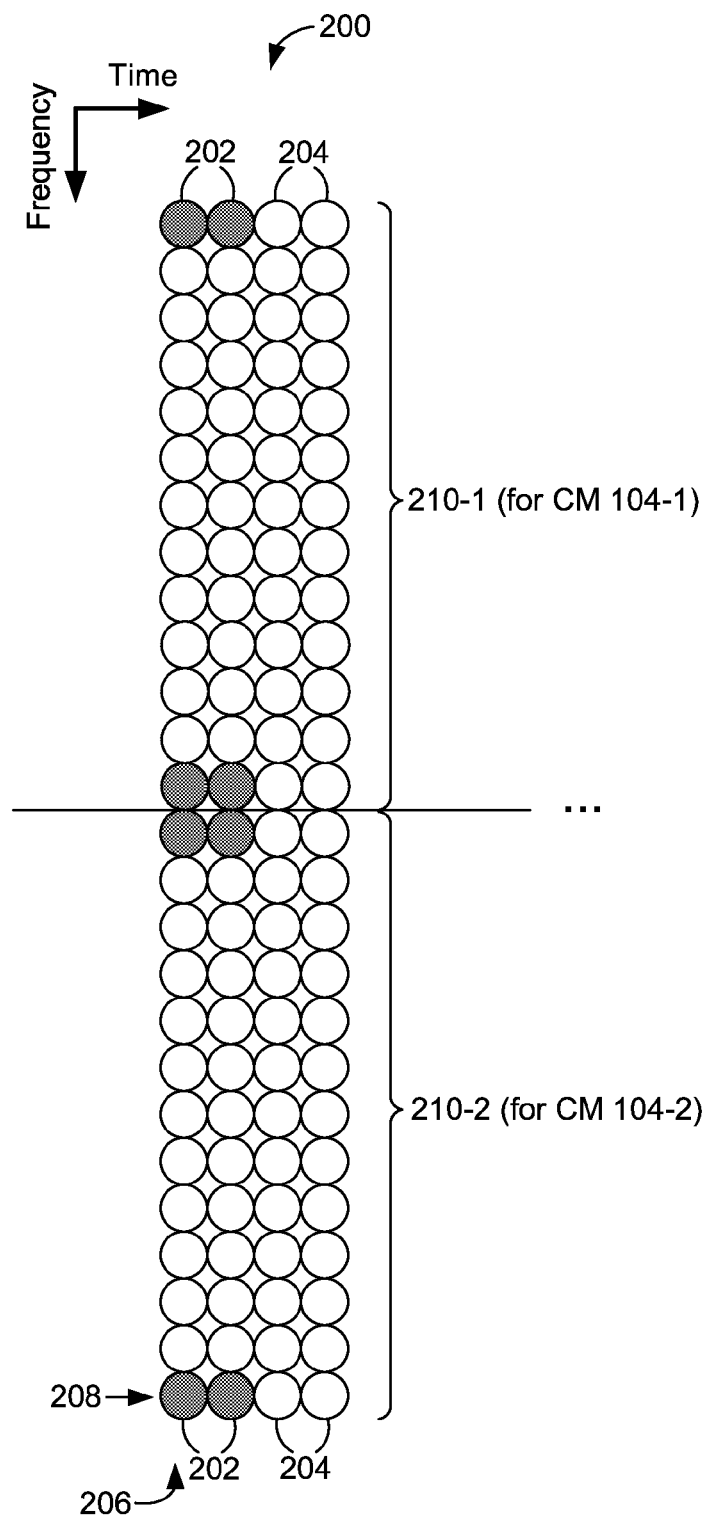
FIG. 2 shows an example of pilot symbol placement for a frame in accordance with some embodiments.

FIG. 2 shows an example of pilot symbol placement for a frame 200 in accordance with some embodiments. Each circle in FIG. 2 represents a modulation symbol on a subcarrier 208; each row of circles corresponds to a respective subcarrier 208. Each column of circles corresponds to a respective OFDM symbol 206, such that each circle (and each column) has a duration equal to the duration of one OFDM symbol 206. A white circle indicates a data symbol 204; a filled circle indicates a pilot symbol 202. A first frame portion 210-1 is assigned to a first cable modem 104-1 (FIGS. 1A-1B) and thus to a first user or set of users. The first frame portion 210-1 includes a first group of subcarriers 208 (e.g., the group 112-3, FIG. 1B). A second frame portion 210-2 is assigned to a second cable modem 104-2 (FIGS. 1A-1B) and thus to a second user or set of users. The second frame portion 210-2 includes a second group of subcarriers 208 (e.g., the group 112-1, FIG. 1B).

The pilot symbols 202 in the frame 200 are arranged such that two pilot symbols 202 on the same subcarrier 208 are adjacent in time: subcarriers 208 that carry pilot symbols 202 in a first OFDM symbol 206 also carry pilot symbols 202 in a second OFDM symbol 206 that immediately follows the first OFDM symbol 206. Including pilot symbols 202 on the same subcarriers 208 in adjacent OFDM symbols 206 allows for phase-noise tracking. These subcarriers 208 may carry data symbols 204 in other OFDM symbols 206 in the frame 200, as shown in FIG. 2. Adjacent pilot symbols 202 in the frame 200 may or may not be identical.

The pilot symbols 202 in the frame 200 are located at the frequency-domain edges of the groups of subcarriers 208 for the frame portions 210-1 and 210-2, and thus at the ends of the frequency chunks/ranges corresponding to the frame portions 210-1 and 210-2. A portion of the OFDM symbols 206 in the frame 200 thus includes pilot symbols 202 at the frequency-domain edges of the groups of subcarriers 208 for the frame portions 210-1 and 210-2. Placement of pilot symbols 202 at these edges avoids extrapolation when performing channel estimation.

The placement of pilot symbols 202 in FIG. 2 also ensures that adjacent subcarriers 208 assigned to different CMs (and thus in different frame portions 210-1 and 210-2) both carry either data symbols 204 or pilot symbols 202 within each OFDM symbol 206. Symbol placement such that adjacent subcarriers 208 assigned to different CMs both carry either data symbols 204 or pilot symbols 202 within an OFDM symbol 206 is referred to herein as back-to-back placement. Back-to-back placement avoids inter-carrier interference between pilot symbols 202 and data symbols 204 for different CMs (and accordingly for different users). For example, pilot symbols 202 may have boosted power as compared to data symbols 204. Placement of a pilot symbol 202 in the frame portion 210-1 next to a data symbol 204 in the frame portion 210-2 (or vice-versa) could result in inter-carrier interference that corrupts the data symbol 204. Back-to-back placement avoids this corruption.

In some embodiments, each frame portion assigned to a respective CM (including, for example, the frame portions 210-1 and 210-2) includes a basic physical resource block (BPRB) and may also include one or more extension blocks. (Since a frame portion may or may not include extension blocks, the number of extension blocks in a frame portion in general is thus zero or more.)

Figure 3:
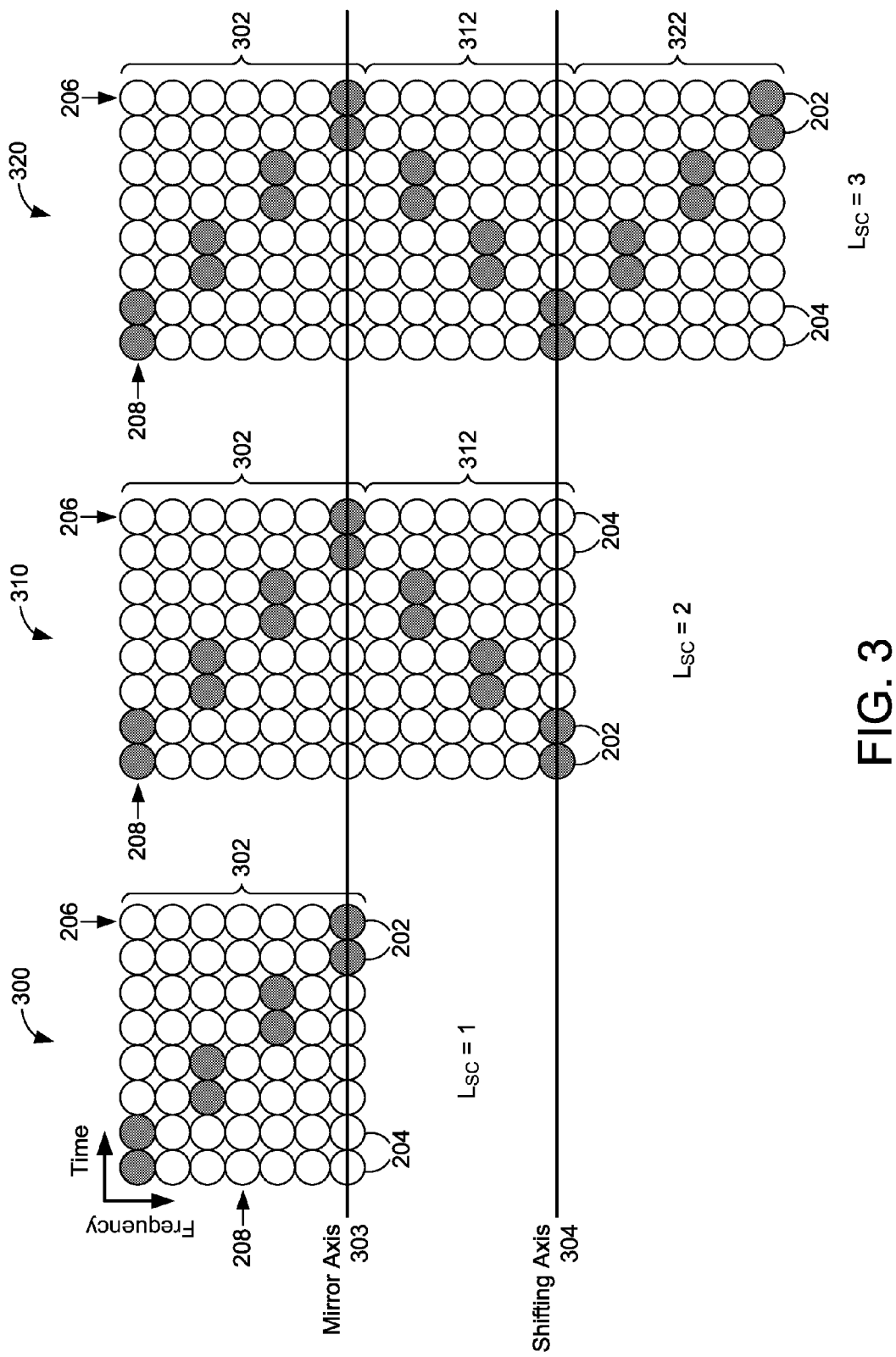
FIG. 3 illustrates frame portions that each include a basic physical resource block and zero or more extension blocks in accordance with some embodiments.

FIG. 3 illustrates three frame portions 300, 310, and 320 that each includes a BPRB 302 and zero or more extension blocks 312 and 322 in accordance with some embodiments. The frame portions 300, 310, and 320 are examples of frame portions 210-1 or 210-2 (FIG. 2). The frames that include the frame portions 300, 310, and 320 each include eight OFDM symbols 206 represented by respective columns of circles. In other examples, the number of OFDM symbols 206 in a frame may be different. Examples of the number of OFDM symbols 206 in a frame include, but are not limited to, six, 16, and 32. The frame length may be adapted to allow for compensation for wide-band interference. In some embodiments, a system such as the network 100 (FIGS. 1A-1B) may accommodate multiple frame lengths (e.g., with lengths that are multiples of two with respect to each other). For example, frame lengths may vary from CM to CM, and thus from user to user.

In some embodiments, time-domain forward error correction (FEC) code word interleaving is performed within respective frames. Interleaving may also be performed between subcarriers 208 in different OFDM symbols 206 and between data symbols 204 with different time and frequency coordinates within a frame. The frame length may be selected to accommodate this interleaving, which mitigates the effect of short-duration wide-band interference.

In some embodiments, the BPRB 302 includes a number of subcarriers 208 sufficient to spread pilot symbols 202 in an even manner with respect to time and frequency. The pilot symbols 202 have a staggered spacing in the time domain and a regular spacing in the frequency domain. For example, the BPRB 302 includes a pilot symbol 202 somewhere in each OFDM symbol 206 (i.e., in each column) and includes a pair of time-adjacent pilot symbols 202 on every other subcarrier 208, including the edge subcarriers 208. Inclusion of pilot symbols 202 on every other subcarrier 208 results in a frequency-domain pilot density of two. (More generally, respective pairs of time-adjacent pilot symbols 202 may be separated in the frequency domain by a specified number of subcarriers 208. The frequency-domain pilot density thus may be adapted to the frequency selectivity of the channel.) The frame portion 300 includes only the BPRB 302 and is said to have an extension length $L_{SC}$ of one (i.e., $L_{SC}=1$).

An extension block is the minimum number of subcarriers 208 that can be allocated to a cable modem in addition to the BPRB 302. The extension block 312 is generated by defining a mirror axis 303 through an edge subcarrier 208 of the BPRB 302 and mirroring the pilot symbols 202 of the BPRB 302 about the mirror axis 303. The extension block 312 thus includes one fewer subcarrier 208 than the BPRB 302, because pilot symbols 202 in the subcarrier 208 corresponding to the mirror axis 303 are not replicated. The frame portion 310 includes the BPRB 302 and one extension block 312 and is said to have an extension length $L_{SC}$ of two (i.e., $L_{SC}=2$). In general, the extension length $L_{SC}$ equals the number of allocated extension blocks 312 and 322 plus one.

The frame portion 320 includes the BPRB 302, the extension block 312, and an extension block 322. The extension block 322 is generated by defining a shifting axis 304 through the last subcarrier 208 of the extension block 312, replicating the pilot symbols 202 for all subcarriers 208 of the BPRB 302 except the first subcarrier 208, and shifting the replicated pilot symbols 202 below the shifting axis 304. The frame portion 320 has an extension length $L_{SC}$ of three (i.e., $L_{SC}=3$).

The frame portion 320 may equivalently be generated by defining a physical resource block (PRB) that includes all of the BPRB 302 except for the last subcarrier 208 corresponding to the mirror axis 303. In the example of FIG. 3, this PRB includes the first six subcarriers 208 of the BPRB 302 but not the seventh subcarrier 208 of the BPRB 302. This PRB (or the pilot symbols 202 within this PRB) is then rotated 180° about an axis at the center of the PRB that comes out of the page (i.e., is perpendicular to both the time and frequency axes). The rotated pilot symbols 202 are then shifted below the shifting axis 304, resulting in the extension block 322.

A frame portion with an extension length $L_{SC}$ of four (i.e., $L_{SC}=4$) may similarly be generated by replicating the pilot symbols 202 for all subcarriers 208 of the BPRB 302 and extension block 322 except the first subcarrier 208 and shifting the replicated pilot symbols 202 below the shifting axis 304.

The mirroring and shifting performed to generate the extension blocks 312 and 322 maintain the time and frequency spreading of pilot symbols 202, as shown in FIG. 3. This mirroring and shifting can be used to generate frame portions of arbitrary extension length and may be applied to frame portions of arbitrary pilot density.

Figure 4A:
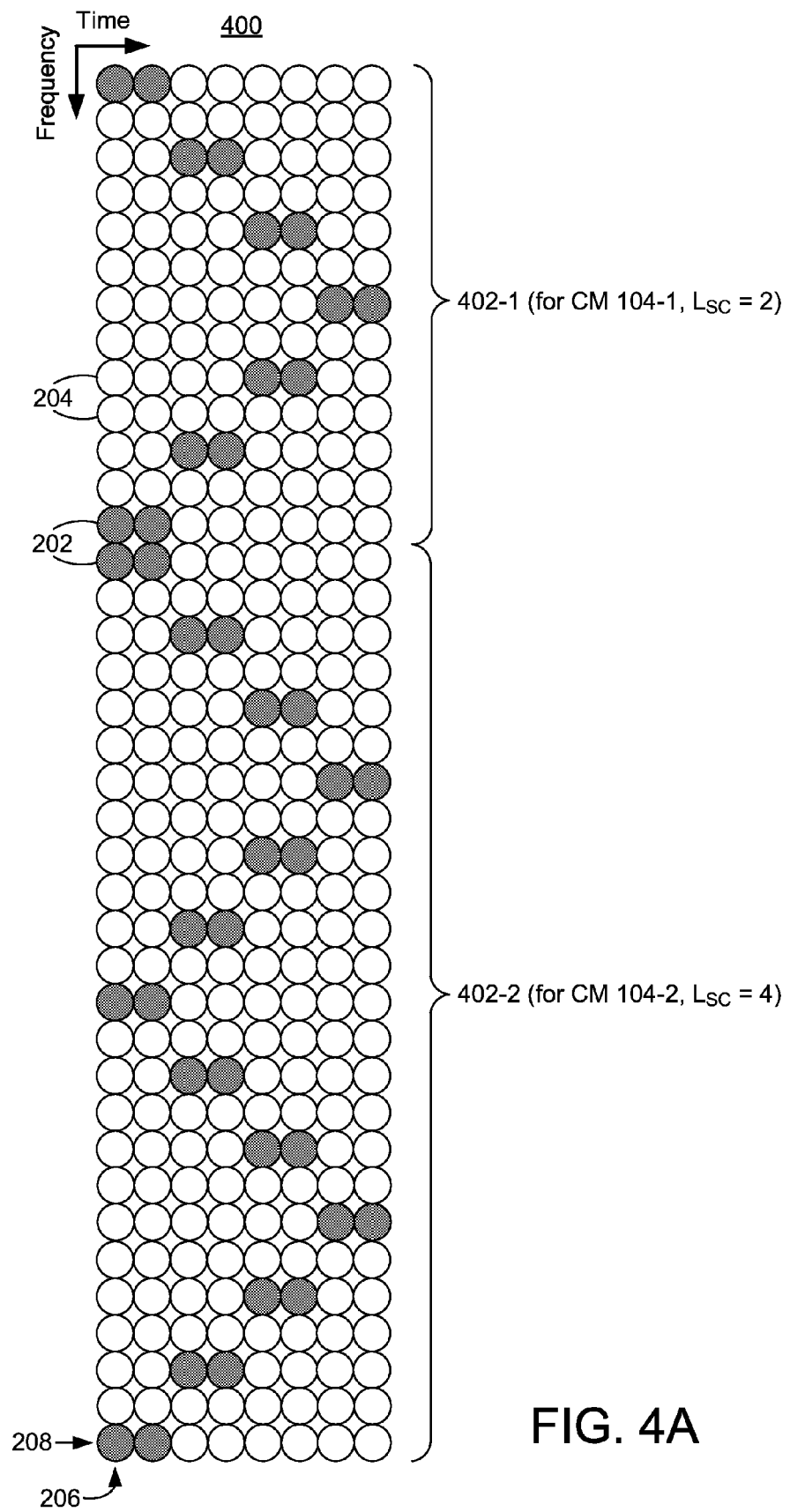
FIGS. 4A and 4B show frames that include a first frame portion assigned to a first cable modem and a second frame portion assigned to a second cable modem in accordance with some embodiments.

FIG. 4A shows a frame 400 that includes a first frame portion 402-1 and a second frame portion 402-2 in accordance with some embodiments. The frame 400 includes eight OFDM symbols 206, represented by the eight columns. The first frame portion 402-1 includes a first group of subcarriers 208 assigned to a first cable modem 104-1 (FIGS. 1A-1B), and thus to a first user or group of users corresponding to the first cable modem 104-1. The first frame portion 402-1 has an extension length $L_{SC}$ of two (i.e., $L_{SC}=2$). The second frame portion 402-2 includes a second group of subcarriers 208 assigned to a second cable modem 104-2 (FIGS. 1A-1B), and thus to a second user or group of users corresponding to the second cable modem 140-2. The second frame portion 402-2 has an extension length $L_{SC}$ of four (i.e., $L_{SC}=4$). The first frame portion 402-1 and second frame portion 402-2 include pilot symbols 202 and data symbols 204 as shown. The pilot symbols 202 are arranged in a pattern generated using the mirroring and shifting described with respect to FIG. 3.

Figure 4B:
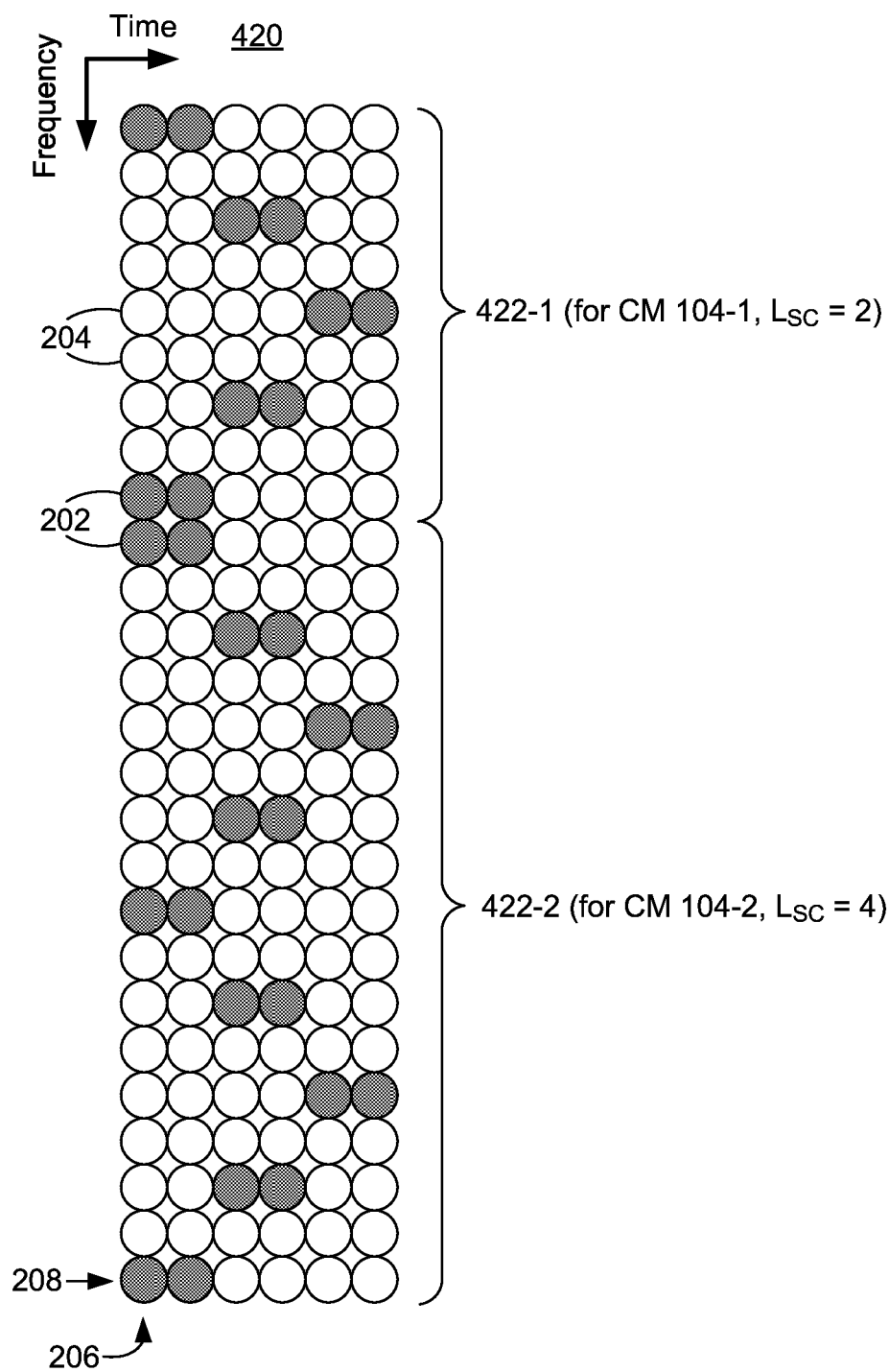

FIG. 4B shows a frame 420 that includes a first frame portion 422-1 and a second frame portion 422-2 in accordance with some embodiments. The frame 420, first frame portion 422-1, and second frame portion 422-2 are analogous to the frame 400, first frame portion 402-1, and second frame portion 402-2 (FIG. 4A), except that they include six OFDM symbols 206 instead of eight OFDM symbols 206. The pilot symbols 202 in the first frame portion 422-1 and second frame portion 422-2 are arranged in a pattern generated using the mirroring and shifting described with respect to FIG. 3.

As FIGS. 4A and 4B illustrate, generating frame portions with even-numbered extension lengths using the mirroring described with respect to FIG. 3 ensures a regular pilot symbol structure with back-to-back placement. This back-to-back placement avoids pilot-to-data inter-carrier interference between frame portions.

While the pilot symbol arrangements of FIGS. 2, 3, 4A, and 4B have been described in the context of upstream transmissions on the cable plant 108 (FIG. 1), they may be used for other types of OFDMA transmissions on other types of channels (e.g., on other media).

The pilot symbols 202 of FIGS. 2, 3, 4A, and/or 4B may be used to perform channel estimation. For example, the CMTS 102 may perform channel estimation using pilot symbols 202 received from the CMs 104-1, 104-2, and 104-3 (FIGS. 1A-1B). In some embodiments, two-dimensional least-squares channel estimation (2D-LSCE) is performed, where the two dimensions are time and frequency. The CMTS 102 may perform 2D-LSCE independently for each of the CMs 104-1, 104-2, and 104-3. The boundaries between frame portions (e.g., frame portions 210-1 and 210-2, FIGS. 2; 402-1 and 402-2, FIG. 4A; or 422-1 and 422-2, FIG. 4B) serve as boundaries for averaging and interpolation performed as part of the 2D-LSCE.

Figure 5A:
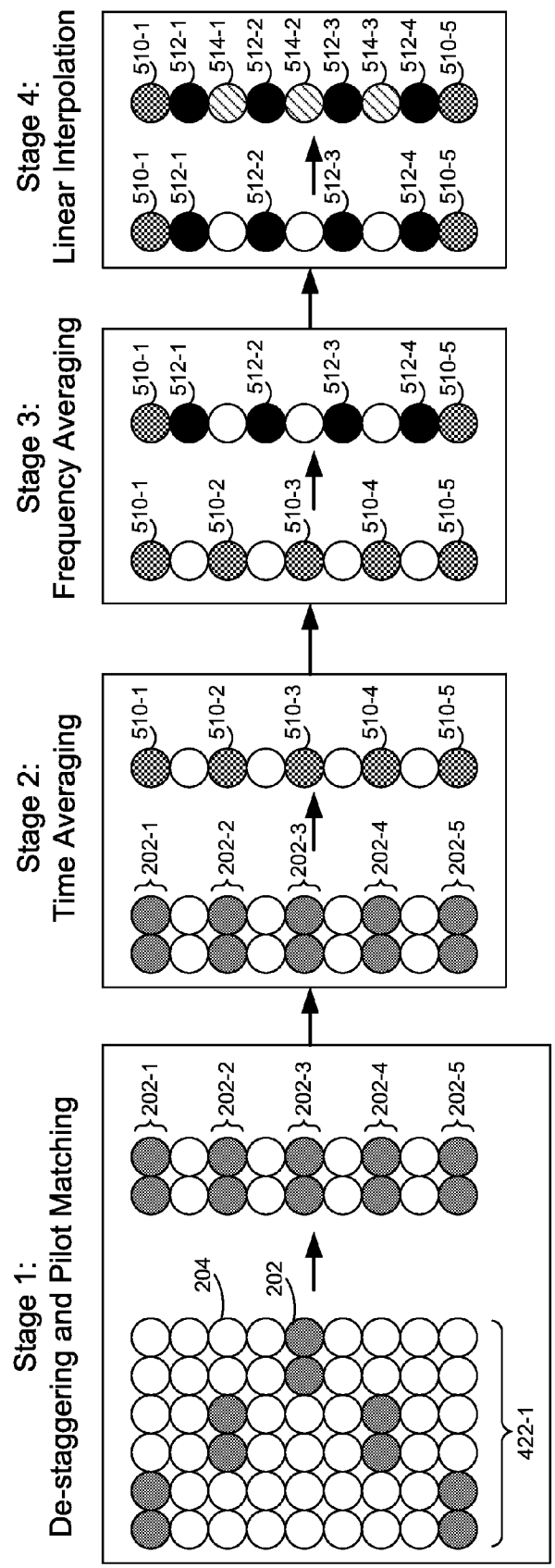
FIGS. 5A-5C show examples of a four-stage channel estimation process in accordance with some embodiments.

FIG. 5A shows a four-stage channel estimation process in accordance with some embodiments. The channel estimation process is shown using the frame portion 422-1 (FIG. 4B) but may be performed using other frame portions (e.g., a frame portion 402-1 or 402-2, FIG. 4A). For example, the channel estimation process may be performed using a frame portion 300, 310, or 320 (FIG. 3) or a frame portion generated using the mirroring and/or shifting described with respect to FIG. 3.

In the first stage (Stage 1), pilot matching is performed: frequency-domain samples of pilot symbols 202 are multiplied with complex-conjugated pilot symbols 202. The frequency-domain samples for each pair of time-adjacent pilot symbols 202-1 through 202-5 are also de-staggered, such that information regarding arrival time of the pilot symbols 202 is discarded.

In the second stage (Stage 2), a channel estimate is generated for each pilot symbol 202. The channel estimates for each pair of pilot symbols 202-1 through 202-5 are then averaged. The second stage thereby performs time averaging over the pilot-matching outcomes of the first stage, in a time-domain LSCE (TD-LSCE) process. This process results in channel estimates 510-1 through 510-5, each based on a respective pair of pilot symbols 202-1 through 202-5. Each of the channel estimates 510-1 through 510-5 corresponds to a respective subcarrier 208 that carried pilot symbols 202 in the frame portion 422-1.

In the third stage (Stage 3), frequency averaging of channel estimates generated in the second stage is performed. The third stage thus performs a frequency-domain LSCE (FD-LSCE) process. For example, the channel estimates 510-1 and 510-2 are averaged to produce a channel estimate 512-1, channel estimates 510-2 and 510-3 are averaged to produce a channel estimate 512-2, channel estimates 510-3 and 510-4 are averaged to produce a channel estimate 512-3, and channel estimates 510-4 and 510-5 are averaged to produce a channel estimate 512-4. These frequency-averaged estimates are merely examples; in general, the number of channel estimates 510-1 through 510-5 that are averaged to produce each frequency-averaged estimate may vary.

Also in the third stage, the channel estimates 510-2, 510-3, and 510-4 from the second stage are discarded. The channel estimates 510-1 and 510-5 for the edge subcarriers 208 are retained, however, to avoid extrapolation in stage four.

In the fourth stage, linear interpolation is performed between channel estimates generated and/or retained in the third stage. For example, linear interpolation is performed between the channel estimates 512-1 and 512-2 to produce a channel estimate 514-1, between the channel estimates 512-2 and 512-3 to produce a channel estimate 514-2, and between the channel estimates 512-3 and 512-4 to produce a channel estimate 514-3. At this point, a channel estimate has been calculated for each subcarrier 208 in the frame portion 422-1, and the channel estimation process of FIG. 5A is complete.

In some embodiments, the third stage is performed using a sliding window. The window is centered on a subcarrier 208 for which a channel estimate is to be generated. The channel estimate is generated by averaging all of the time-averaged channel estimates from the second stage that fall within the window. The window is then shifted to a position where it is centered on the next subcarrier 208 for which a channel estimate is to be generated. The amount by which the window is shifted equals the spectral pilot spacing in the frame portion. The size of the window may vary; for example, the size of the window may be adapted in accordance with the channel coherence bandwidth.

Figure 5B:
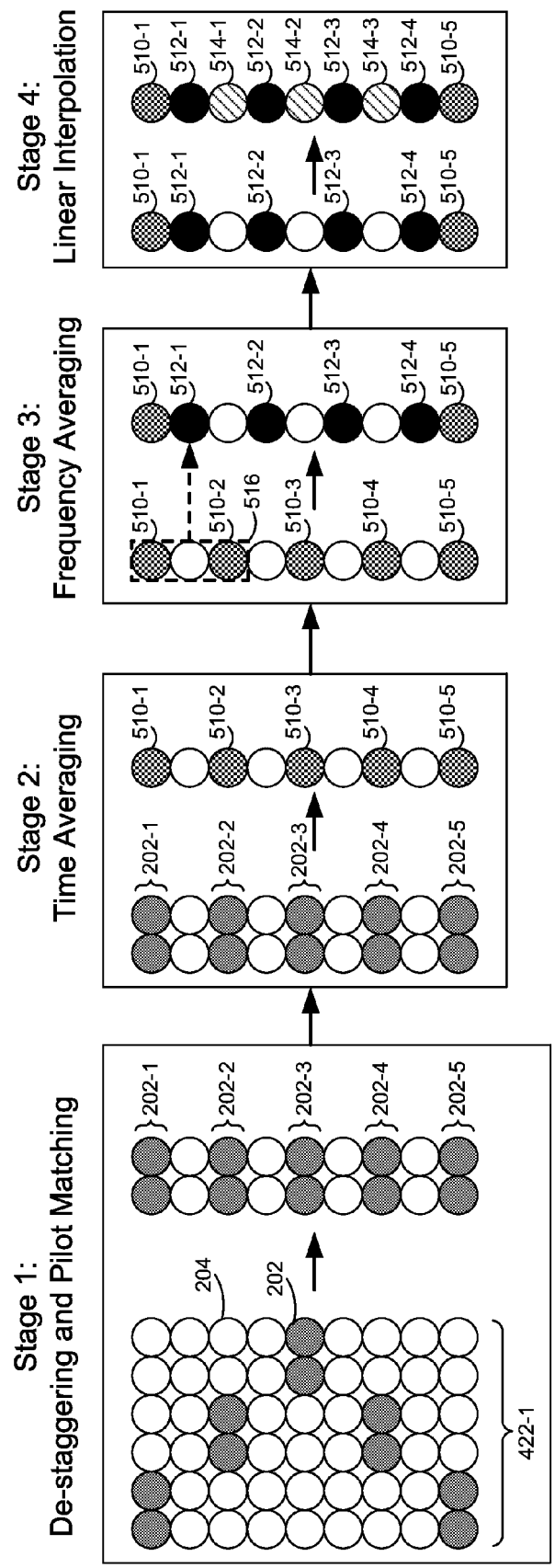

FIG. 5B shows a sliding window 516 with a length of three (i.e., encompassing three subcarriers 208) as used in the channel estimation process of FIG. 5A. The sliding window 516 is positioned over the first three subcarriers 208 in the frame portion 422-1, such that the subcarriers 208 corresponding to the channel estimates 510-1 and 510-2 fall within the sliding window 516. The channel estimates 510-1 and 510-2 are averaged to produce the channel estimate 512-1. The sliding window 516 then slides down by two subcarriers 208 (since the spectral pilot spacing for the frame portion 422-1 is two, with pilot symbols 202 on every other subcarrier 208). The subcarriers 208 corresponding to the channel estimates 510-2 and 510-3 now fall within the sliding window 516. The channel estimates 510-2 and 510-3 are averaged to produce the channel estimate 512-2. The channel estimates 512-3 and 512-4 are generated in a similar manner.

Figure 5C:
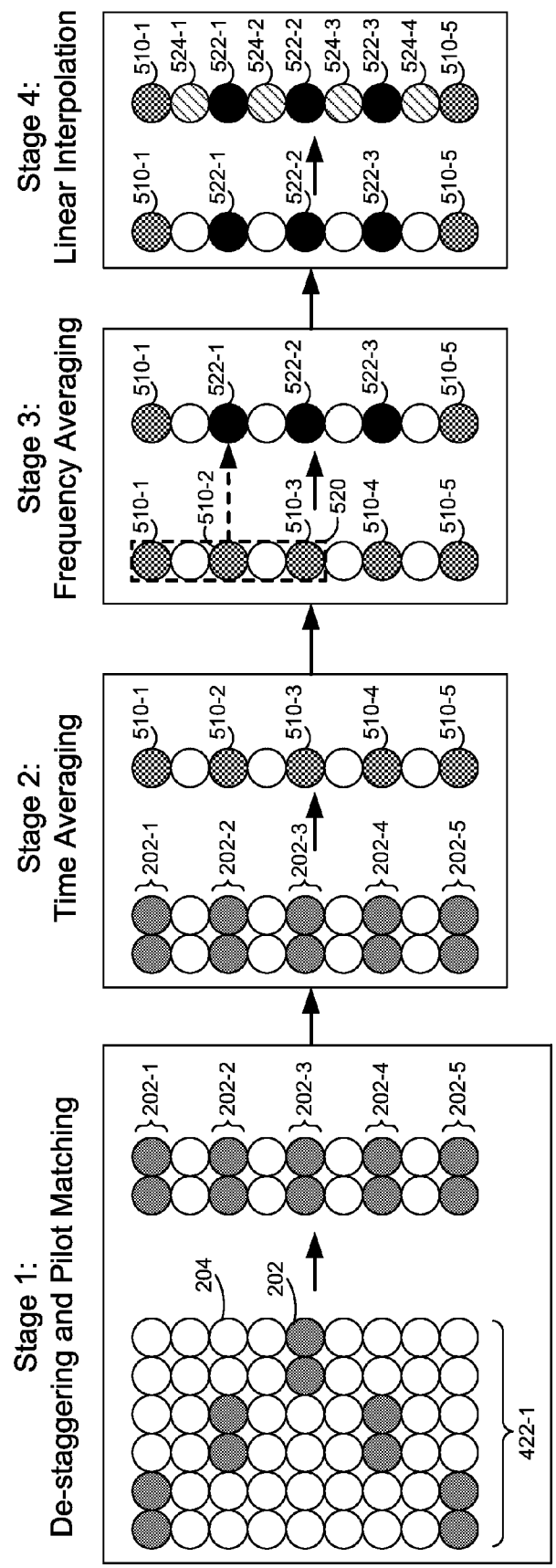

FIG. 5C shows an alternative to FIG. 5B in which a sliding window 520 with a length of five (i.e., encompassing five subcarriers 208) is used for the frequency averaging of the third stage. The sliding window 520 is positioned over the first five subcarriers 208 in the frame portion 422-1, such that the subcarriers 208 corresponding to the channel estimates 510-1, 510-2, and 510-3 fall within the sliding window 520. Channel estimates 510-1, 510-2, and 510-3 are accordingly averaged to produce a channel estimate 522-1. The channel estimate 522-1 replaces the channel estimate 510-2 for the corresponding subcarrier 208. The sliding window 520 then slides down by two subcarriers 208, and the channel estimates 510-2, 510-3, and 510-4 are averaged to produce a channel estimate 522-2. The channel estimate 522-2 replaces the channel estimate 510-3 for the corresponding subcarrier 208. The sliding window 520 then slides down by two more subcarriers 208, and the channel estimates 510-3, 510-4, and 510-5 are averaged to produce a channel estimate 522-3. The channel estimate 522-3 replaces the channel estimate 510-4 for the corresponding subcarrier 208.

In the fourth stage of the channel estimation process of FIG. 5C, linear interpolation is performed using the channel estimates 510-1, 522-1 through 522-3, and 510-5, as received from the third stage. Linear interpolation is performed between the channel estimates 510-1 and 522-1 to produce a channel estimate 524-1, between the channel estimates 522-1 and 522-2 to produce a channel estimate 524-2, and so on.

In some embodiments (e.g., embodiments with even window lengths), LSCE oversampling (e.g., 2× oversampling) is performed to avoid spectral shifts of half a subcarrier 208. Oversampling for even window lengths avoids assignment of the frequency-averaged channel estimate to a frequency that is either half a subcarrier 208 above the center frequency of the window or half a subcarrier 208 below the center frequency of the window. The interpolation of the fourth stage is done over the oversampled frequencies; the results of the interpolation are then downsampled (e.g., by a factor of two, for 2× downsampling) to obtain the channel estimates at the desired frequencies.

The channel estimation processes of FIGS. 5B and 5C exploit the effectively flat channel provided by OFDM: each subcarrier 208 may be treated as a narrow-band channel, such that channel estimation involves calculation of a single coefficient. Channel estimates may therefore be generated in a computationally efficient manner, without division or matrix inversion.

The processes of FIGS. 5A-5C have been described as using LSCE and linear interpolation. In some embodiments, however, other types of channel estimation and/or other types of interpolation may be performed. For example, minimum mean-squared error (MMSE) channel estimation may be performed.

Figure 6A:
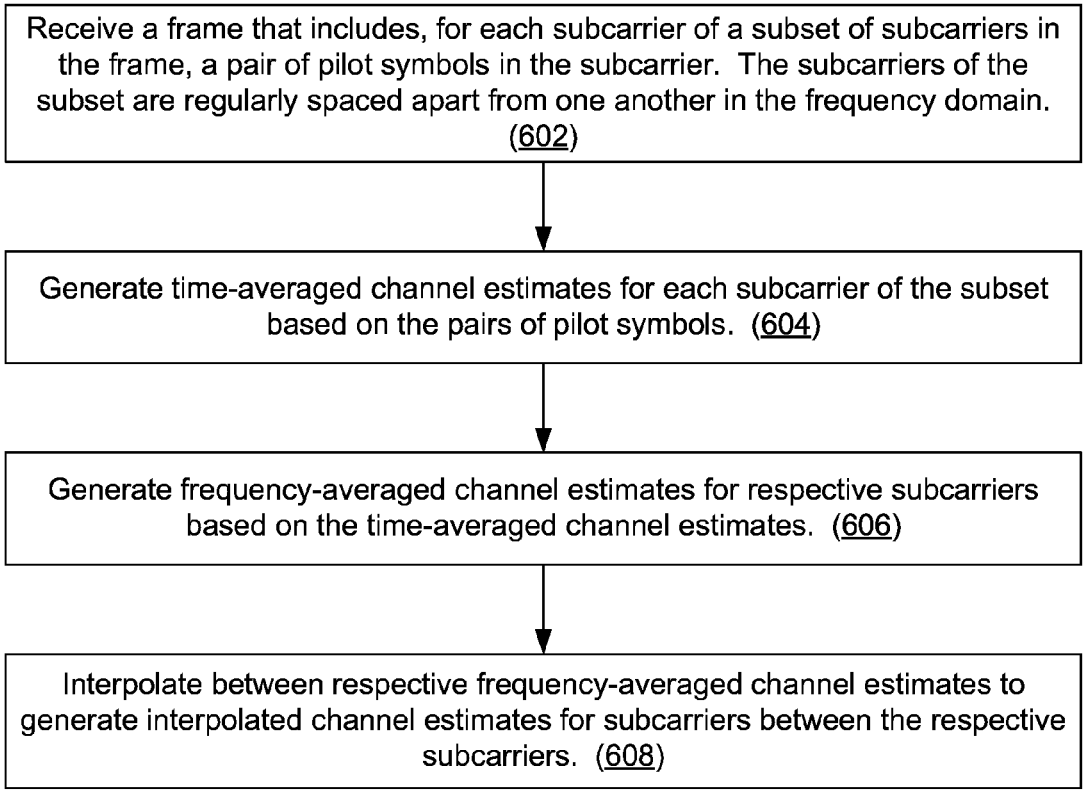

FIG. 6A is a flowchart showing a method 600 of performing channel estimation in accordance with some embodiments. The method 600 is performed, for example, in a CMTS 102 (FIGS. 1A-1B) or another device that communicates using OFDM (e.g., OFDMA).

In the method 600, a frame (e.g., a frame 400 or 420, FIGS. 4A-4B) is received (602) that includes a pair of pilot symbols 202 in each subcarrier 208 of a subset of subcarriers 208 in the frame. The subcarriers 208 of the subset, and thus the pairs of pilot symbols 202, are regularly spacing apart from one another in the frequency domain (e.g., with a spacing of two, as shown in FIGS. 4A-4B).

Time-averaged channel estimates (e.g., channel estimates 510-1 through 510-5, FIGS. 5A-5C) are generated (604) for each subcarrier 208 of the subset based on the pairs of pilot symbols 202 (e.g., based on respective pairs of pilot symbols 202-1 through 202-5, FIGS. 5A-5C).

Frequency-averaged channel estimates (e.g., channel estimates 512-1 through 512-4, FIGS. 5A-5B; channel estimates 522-1 through 522-3, FIG. 5C) are generated (606) for respective subcarriers 208 based on the time-averaged channel estimates. In some embodiments, a frequency-averaged channel estimate for a respective subcarrier 208 is generated by averaging time-averaged channel estimates for two adjacent subcarriers 208 (e.g., as shown in FIGS. 5A and 5B). In some embodiments, time-averaged channel estimates for respective subcarriers 208 are replaced with frequency-averaged channel estimates for the respective subcarriers 208 (e.g., as shown in FIG. 5C).

Interpolation (e.g., linear interpolation) is performed (608) between respective frequency-averaged channel estimates. The interpolation produces channel estimates for subcarriers 208 that are between the respective subcarriers 208 of operation 606 and therefore lack frequency-averaged channel estimates. For example, the interpolation produces channel estimates 514-1 through 514-3 (FIGS. 5A-5B) or channel estimates 524-2 and 524-3 (FIG. 5C).

In some embodiments, the frame that is received in the operation 602 is an OFDMA frame that includes multiple frame portions (e.g., portions 402-1 and 402-2, FIG. 4A; portions 422-1 and 422-2, FIG. 4B) corresponding to respective transmitting devices (e.g., respective ones of the CMs 104-1 through 104-3, FIGS. 1A-1B). For example, the frame portions are non-overlapping, contiguous groups of subcarriers 208. Each of the frame portions includes, for each subcarrier 208 of a subset of subcarriers 208 in the frame portion, a pair of pilot symbols 202 in the subcarrier 208. The pairs of pilot symbols 202 are regularly spaced in the frequency domain. The operations 604, 606, and 608 of the method 600 are repeated for each of the frame portions.

FIG. 6B is a flowchart showing a method 650 of performing channel estimation in accordance with some embodiments. The method 650 is an example of the method 600 (FIG. 6A) and is performed in a CMTS 102 (FIGS. 1A-1B) or another device that communicates using OFDM (e.g., OFDMA).

In the method 650, a frame is received (602) that includes a pair of pilot symbols 202 in each subcarrier 208 of a subset of subcarriers 208 in the frame, as described for the method 600 (FIG. 6A). In some embodiments, the pairs of pilot symbols 202 are situated (652) in adjacent OFDM symbols 206 (e.g., as shown in FIG. 4A or 4B). In some embodiments, the pairs of pilot symbols 202 have (654) a staggered spacing in the time domain (e.g., as shown in FIG. 4A or 4B).

The pairs of pilot symbols 202 are de-staggered (656), such that information regarding arrival time of the pilot symbols 202 is discarded. Examples of de-staggering are shown in Stage 1 of FIGS. 5A-5C.

Pilot matching is performed (658) for the pilot symbols 202: pilot symbols 202 are multiplied with respective complex-conjugated pilot symbols 202.

Channel estimates corresponding to the pilot symbols 202 are generated (660), based on the pilot matching. In some embodiments, these channel estimates are generated by performing time-domain LSCE. Alternatively, another type of channel estimation (e.g., MMSE channel estimation) is performed.

Time-averaged channel estimates are generated (604) for each subcarrier 208 of the subset based on the pairs of pilot symbols 202, as described for the method 600 (FIG. 6A). In some embodiments, channel estimates corresponding to respective pairs of the pilot symbols 202 are averaged (662) to produce the time-averaged channel estimates (e.g., as described for Stage 2 of FIGS. 5A-5C).

Frequency-averaged channel estimates are generated (606) for respective subcarriers 208 based on the time-averaged channel estimates, as described for the method 600 (FIG. 6A). In some embodiments, a sliding frequency window (e.g., sliding window 516, FIG. 5B; sliding window 520, FIG. 5C) is used (664) to specify subcarriers 208 for which respective time-averaged channel estimates are to be averaged. In some embodiments, oversampling is performed (666) (e.g., to avoid spectral shifts of half a subcarrier 208).

Interpolation is performed (608) between respective frequency-averaged channel estimates to generate interpolated channel estimates, as described for the method 600 (FIG. 6A). In some embodiments, the interpolation is performed (668) over oversampled frequencies and the results of the interpolation are down-sampled.

In some embodiments, interpolation (e.g., linear interpolation) is performed (670) between a time-averaged channel estimate for an edge subcarrier 208 and a frequency-averaged channel estimate for another subcarrier 208, to generate an interpolated channel estimate. For example, interpolation is performed between time-averaged channel estimate 510-1 and frequency-averaged channel estimate 522-1 to produce channel estimate 524-1 (FIG. 5C). Similarly, interpolation is performed between time-averaged channel estimate 510-5 and frequency-averaged channel estimate 522-3 to produce channel estimate 524-4 (FIG. 5C). In these examples, the frame received in the operation 602 is an OFDMA frame (e.g., a frame 400 or 420, FIGS. 4A-4B) and the edge subcarrier 208 is at an edge of a group of contiguous subcarriers 208 (e.g., a portion 402-1 or 402-2, FIG. 4A; a portion 422-1 or 422-2, FIG. 4B) assigned to a respective transmitting device. While time-averaged channel estimates for edge subcarriers 208 are retained, other time-averaged channel estimates (e.g., channel estimates 510-2, 510-3, and 510-4, FIGS. 5A-5C) are discarded (e.g., after generating the frequency-averaged channel estimates in the operation 606).

While the methods 600 and 650 include a number of operations that appear to occur in a specific order, it should be apparent that the methods 600 and 650 can include more or fewer operations, some of which can be executed serially or in parallel. An order of two or more operations may be changed, performance of two or more operations may overlap, and two or more operations may be combined into a single operation.

Figure 7:
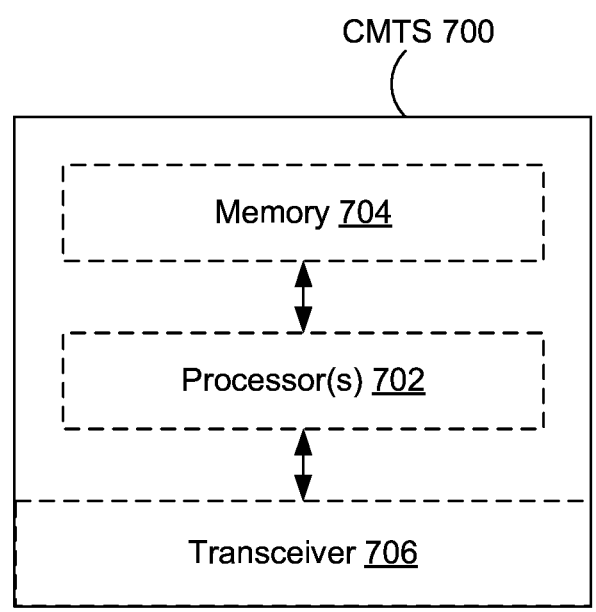
FIG. 7 is a block diagram of a cable modem termination station in accordance with some embodiments.

In some embodiments, channel estimation (e.g., as shown in FIGS. 5A, 5B, and/or 5C) is performed in software. For example, FIG. 7 is a block diagram of a CMTS 700 in a network such as the network 100 (FIGS. 1A-1B) in accordance with some embodiments. The CMTS 700 is an example of a CMTS 102 (FIGS. 1A-1B). In the CMTS 700, a transceiver 706 is coupled to one or more processors 702, which are coupled to memory 704. The transceiver 706 receives signals with embedded pilot symbols 202 (e.g., as shown in FIGS. 2, 3, 4A, and/or 4B) from cable modems coupled to the CMTS 700 (e.g., CMs 104-1, 104-2, and 140-3, FIGS. 1A-1B). The memory 704 includes a non-transitory computer-readable medium (e.g., one or more nonvolatile memory elements, such as EPROM, EEPROM, Flash memory, a hard disk drive, and so on) that stores instructions for execution by the one or more processors 702. The instructions include instructions that, when executed by the processor(s) 702, cause the CMTS 700 to perform channel estimation as described herein (e.g., as shown in FIGS. 5A, 5B, and/or 5C). For example, the instructions include instructions that, when executed by the processor(s) 702, cause the CMTS 700 to perform the methods 600 and/or 650 (FIGS. 6A-6B).

While the memory 704 is shown as being separate from the processor(s) 702, all or a portion of the memory 704 may be embedded in the processor(s) 702. In some embodiments, the processor(s) 702 and/or memory 704 are implemented in the same integrated circuit as the transceiver 706. For example, the transceiver 706 may be integrated with the processor(s) 702 in a single chip, while the memory 704 is implemented in separate chips. In another example, the transceiver 706, processor(s) 702, and memory 704 are all integrated in a single chip.

The apparatus of FIG. 7 has been described as a CMTS 700 but may instead be another type of communications device that performs OFDMA.

In the foregoing specification, the present embodiments have been described with reference to specific exemplary embodiments thereof. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense.

What is claimed is:

1. A method of performing channel estimation, comprising:
   receiving a frame comprising, for each subcarrier of a subset of subcarriers in the frame, a pair of time-adjacent pilot symbols in the subcarrier, wherein the subcarriers of the subset are regularly spaced apart from one another in the frequency domain, wherein a first subsequent pair of time-adjacent pilot symbols is in an increasing frequency order for a first frequency range;
   generating time-averaged channel estimates for each subcarrier of the subset based on the pairs of time-adjacent pilot symbols;
   generating frequency-averaged channel estimates for respective subcarriers based on the time-averaged channel estimates; and
   interpolating between respective frequency-averaged channel estimates to generate interpolated channel estimates for subcarriers between the respective subcarriers;
   wherein:
   the frame comprises an orthogonal frequency-division multiple-access (OFDMA) frame comprising multiple frame portions corresponding to respective transmitting devices;
   each of the multiple frame portions comprises, for each subcarrier of a subset of subcarriers in the frame portion, a pair of time-adjacent pilot symbols, the pairs of time-adjacent pilot symbols being regularly spaced in the frequency domain within the frame portion, wherein a second subsequent pair of time-adjacent pilot symbols is in a decreasing frequency order for a second frequency range; and
   the method further comprises repeating generating the time-averaged channel estimates, generating the frequency-averaged channel estimates, and interpolating between respective frequency-averaged channel estimates for each of the multiple frame portions.

2. The method of claim 1, wherein the multiple frame portions comprise non-overlapping, contiguous groups of subcarriers.

3. The method of claim 1, wherein the pairs of time-adjacent pilot symbols comprise pairs of pilot symbols in adjacent orthogonal frequency-division multiplexing (OFDM) symbols.

4. The method of claim 3, wherein the pairs of pilot symbols have a staggered spacing in the time domain, the method further comprising de-staggering the pairs of pilot symbols.

5. The method of claim 1, further comprising:
   performing pilot matching for the pilot symbols; and
   generating channel estimates corresponding to the pilot symbols, based on the pilot matching;
   wherein generating the time-averaged channel estimates comprises averaging channel estimates corresponding to respective pairs of the time-adjacent pilot symbols.

6. The method of claim 5, wherein generating the channel estimates corresponding to the pilot symbols comprises performing time-domain least-squares channel estimation.

7. The method of claim 1, wherein generating the frequency-averaged channel estimates comprises, for a respective subcarrier having two adjacent subcarriers, averaging time-averaged channel estimates for the two adjacent subcarriers.

8. The method of claim 1, wherein generating the frequency-averaged channel estimates comprises replacing time-averaged channel estimates for respective subcarriers with frequency-averaged channel estimates for the respective subcarriers.

9. The method of claim 1, wherein generating the frequency-averaged channel estimates comprises using a sliding frequency window to specify subcarriers for which respective time-averaged channel estimates are to be averaged.

10. The method of claim 1, wherein:
    generating the frequency-averaged channel estimates comprises performing oversampling;
    the interpolating is performed over oversampled frequencies; and
    the method further comprises down-sampling results of the interpolating.

11. The method of claim 1, wherein the interpolating comprises performing linear interpolation between respective frequency-averaged channel estimates.

12. The method of claim 1, wherein generating the time-averaged channel estimates comprises generating a time-averaged channel estimate for an edge subcarrier, the method further comprising:
    retaining the time-averaged channel estimate for the edge subcarrier; and
    interpolating between the time-averaged channel estimate for the edge subcarrier and a frequency-averaged channel estimate for another subcarrier, to generate an interpolated channel estimate.

13. The method of claim 12, wherein:
    the frame is an OFDMA frame; and
    the edge subcarrier is at an edge of a group of contiguous subcarriers assigned to a respective transmitting device.

14. A communications device, comprising:
    a transceiver to receive a frame comprising, for each subcarrier of a subset of subcarriers in the frame, a pair of time-adjacent pilot symbols in the subcarrier, wherein the subcarriers of the subset are regularly spaced apart from one another in the frequency domain, wherein a first subsequent pair of time-adjacent pilot symbols is in an increasing frequency order for a first frequency range;
    one or more processors; and a memory storing one or more programs configured for execution by the one or more processors, the one or more programs comprising:

instructions to generate time-averaged channel estimates for each subcarrier of the subset based on the pairs of time-adjacent pilot symbols;

instructions to generate frequency-averaged channel estimates for respective subcarriers based on the time-averaged channel estimates; and instructions to interpolate between respective frequency-averaged channel estimates, to generate interpolated channel estimates for subcarriers between the respective subcarriers;

wherein:

the frame comprises an OFDMA frame comprising multiple frame portions corresponding to respective transmitting devices;

each of the multiple frame portions comprises, for each subcarrier of a subset of subcarriers in the frame portion, a pair of time-adjacent pilot symbols, the pairs of time-adjacent pilot symbols being regularly spaced in the frequency domain within the frame portion, wherein a second subsequent pair of time-adjacent pilot symbols is in a decreasing frequency order for a second frequency range; and the one or more programs further comprise instructions to repeat generating the time-averaged channel estimates, generating the frequency-averaged channel estimates, and interpolating between respective frequency-averaged channel estimates for each of the multiple frame portions.

15. The communications device of claim 14, wherein:
the pairs of time-adjacent pilot symbols comprise pairs of pilot symbols in adjacent OFDM symbols and have a staggered spacing in the time domain; and
the one or more programs further comprise instructions to de-stagger the pairs of pilot symbols.

16. The communications device of claim 14, wherein the instructions to generate the frequency-averaged channel estimates comprise instructions to specify subcarriers for which respective time-averaged channel estimates are to be averaged using a sliding frequency window.

17. The communications device of claim 14, wherein:
the instructions to generate the frequency-averaged channel estimates comprise instructions to perform oversampling; and
the instructions to interpolate comprise instructions to perform interpolation over oversampled frequencies and to down-sample results of the interpolation.

18. The communications device of claim 14, wherein:
the instructions to generate the time-averaged channel estimates comprise instructions to generate a time-averaged channel estimate for an edge subcarrier; and
the one or more programs further comprise instructions to interpolate between the time-averaged channel estimate for the edge subcarrier and a frequency-averaged channel estimate for another subcarrier, to generate an interpolated channel estimate.

19. A non-transitory computer-readable storage medium storing one or more programs configured to be executed by one or more processors in a communications device, the one or more programs comprising:

instructions to generate time-averaged channel estimates for each subcarrier of a subset of subcarriers in a frame based on respective pairs of time-adjacent pilot symbols in the subset, wherein each subcarrier of the subset comprises a respective pair of time-adjacent pilot symbols and the subcarriers of the subset are regularly spaced apart from one another in the frequency domain, wherein a first subsequent pair of time-adjacent pilot symbols is in an increasing frequency order for a first frequency range;

instructions to generate frequency-averaged channel estimates for respective subcarriers based on the time-averaged channel estimates; and instructions to interpolate between respective frequency-averaged channel estimates, to generate interpolated channel estimates for subcarriers between the respective subcarriers;

wherein:

the frame comprises an OFDMA frame comprising multiple frame portions corresponding to respective transmitting devices;

each of the multiple frame portions comprises, for each subcarrier of a subset of subcarriers in the frame portion, a pair of time-adjacent pilot symbols, the pairs being regularly spaced in the frequency domain within the frame portion, wherein a second subsequent pair of time-adjacent pilot symbols is in a decreasing frequency order for a second frequency range; and the one or more programs further comprise instructions to repeat generating the time-averaged channel estimates, generating the frequency-averaged channel estimates, and interpolating between respective frequency-averaged channel estimates for each of the multiple frame portions.

20. The non-transitory computer-readable storage medium of claim 19, wherein:
the pairs of time-adjacent pilot symbols comprise pairs of pilot symbols in adjacent OFDM symbols and have a staggered spacing in the time domain; and
the one or more programs further comprise instructions to de-stagger the pairs of pilot symbols.

21. The non-transitory computer-readable storage medium of claim 19, wherein the instructions to generate the frequency-averaged channel estimates comprise instructions to specify subcarriers for which respective time-averaged channel estimates are to be averaged using a sliding frequency window.

22. The non-transitory computer-readable storage medium of claim 19, wherein:
the instructions to generate the frequency-averaged channel estimates comprise instructions to perform oversampling; and
the instructions to interpolate comprise instructions to perform interpolation over oversampled frequencies and to down-sample results of the interpolation.

23. The non-transitory computer-readable storage medium of claim 19, wherein:
the instructions to generate the time-averaged channel estimates comprise instructions to generate a time-averaged channel estimate for an edge subcarrier; and
the one or more programs further comprise instructions to interpolate between the time-averaged channel estimate for the edge subcarrier and a frequency-averaged channel estimate for another subcarrier, to generate an interpolated channel estimate.

24. A communications device, comprising:
means for receiving a frame comprising, for each subcarrier of a subset of subcarriers in the frame, a pair of time-adjacent pilot symbols in the subcarrier, wherein the subcarriers of the subset are regularly spaced apart from one another in the frequency domain, wherein a subsequent pair of time-adjacent pilot symbols is in an increasing frequency order for a first frequency range;

means for generating time-averaged channel estimates for each subcarrier of the subset based on the pairs of time-adjacent pilot symbols;

means for generating frequency-averaged channel estimates for respective subcarriers based on the time-averaged channel estimates; and means for interpolating between respective frequency-averaged channel estimates to generate interpolated channel estimates for subcarriers between the respective subcarriers;

wherein:

the frame comprises an orthogonal frequency-division multiple-access (OFDMA) frame comprising multiple frame portions corresponding to respective transmitting devices;

each of the multiple frame portions comprises, for each subcarrier of a subset of subcarriers in the frame portion, a pair of time-adjacent pilot symbols, the pairs of time-adjacent pilot symbols being regularly spaced in the frequency domain within the frame portion, wherein a second subsequent pair of time-adjacent pilot symbols is in a decreasing frequency order for a second frequency range; and the communications device further comprises means for repeating generating the time-averaged channel estimates, generating the frequency-averaged channel estimates, and interpolating between respective frequency-averaged channel estimates for each of the multiple frame portions.

25. The communications device of claim 24, wherein:
the pairs of time-adjacent pilot symbols comprise pairs of pilot symbols in adjacent OFDM symbols and have a staggered spacing in the time domain; and
the communications device further comprises means for de-staggering the pairs of pilot symbols.

26. The communications device of claim 24, further comprising means for using a sliding frequency window to specify subcarriers for which respective time-averaged channel estimates are to be averaged.

27. The communications device of claim 24, wherein:
the means for generating time-averaged channel estimates comprises means for generating a time-averaged channel estimate for an edge subcarrier; and
the communications device further comprises means for interpolating between the time-averaged channel estimate for the edge subcarrier and a frequency-averaged channel estimate for another subcarrier, to generate an interpolated channel estimate.

* * * * *